United States Patent [19]
Huebner

[11] Patent Number: 6,073,513
[45] Date of Patent: Jun. 13, 2000

[54] RELEASE ROD FOR PARKING BRAKE AND METHOD OF ASSEMBLING SAME

[75] Inventor: Mark Andrew Huebner, Clinton Township, Mich.

[73] Assignee: Dura Automotive Systems, Inc., Rochester Hills, Mich.

[21] Appl. No.: 08/658,007

[22] Filed: Jun. 4, 1996

[51] Int. Cl.⁷ .................................................... B60T 7/08
[52] U.S. Cl. .............................................. 74/535; 74/538
[58] Field of Search ........................... 74/535, 538, 536, 74/537, 575

[56] References Cited

U.S. PATENT DOCUMENTS

| | | | |
|---|---|---|---|
| 2,978,926 | 4/1961 | Hinsey | 74/535 X |
| 4,385,529 | 5/1983 | Ejiri et al. | 74/535 |
| 5,303,610 | 4/1994 | Noel et al. | 74/535 |
| 5,907,977 | 6/1999 | Huebner et al. | 74/535 X |

FOREIGN PATENT DOCUMENTS

| | | | |
|---|---|---|---|
| 476208 | 3/1992 | European Pat. Off. | 74/535 |
| 2583362 | 12/1986 | France | 74/538 |
| 4-126649 | 4/1992 | Japan | 74/538 |

*Primary Examiner*—Mary Ann Battista
*Attorney, Agent, or Firm*—Douglas E. Sittler; Michael K. Boyer

[57] ABSTRACT

A parking brake control having an improved release rod assembly comprising a release rod and a pawl. The pawl can be retained by the release rod so that the release rod and pawl can be stored and transported as a subassembly. Compression force is transmitted coplanarly from the release rod to the pawl. The release rod can be molded as a single piece and can dampen any rattling noise caused by contact between the release rod, the pawl and other parts of the parking brake control.

18 Claims, 4 Drawing Sheets

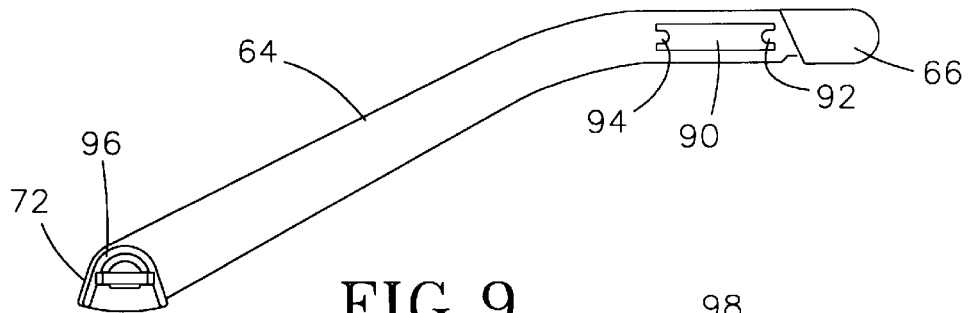
FIG.9
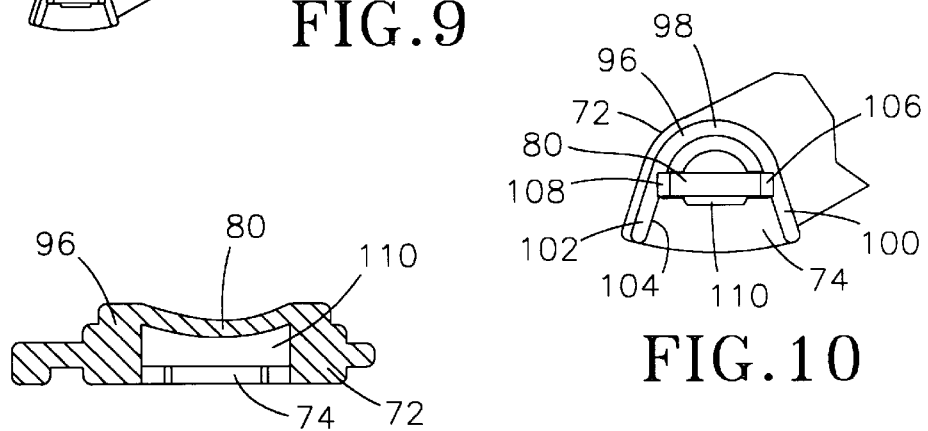
FIG.10
FIG.11
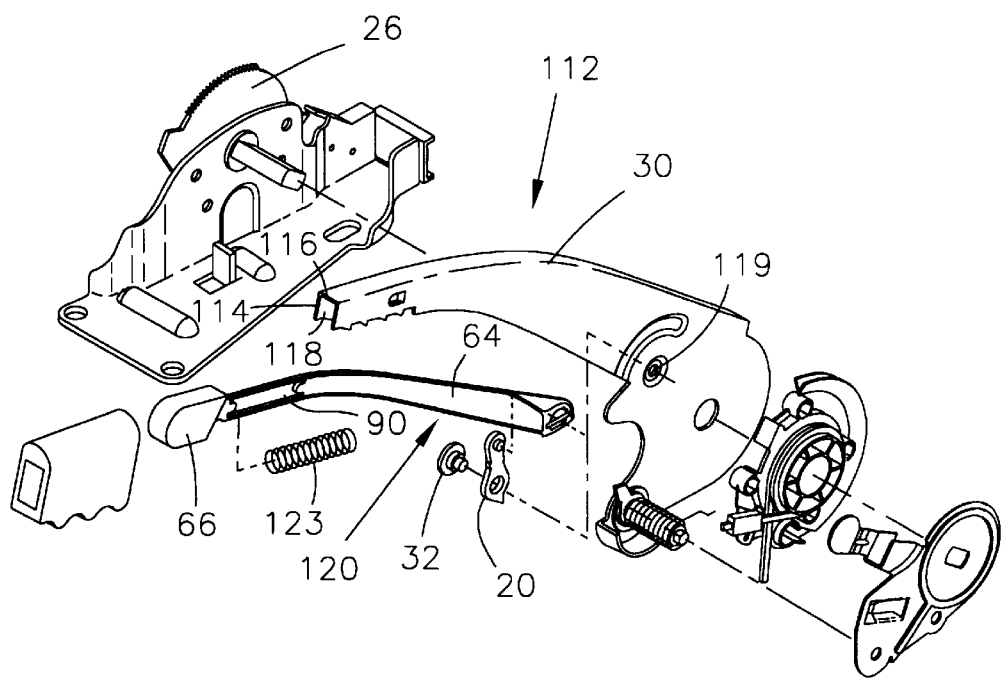
FIG.12

RELEASE ROD FOR PARKING BRAKE AND METHOD OF ASSEMBLING SAME

BACKGROUND OF THE INVENTION

1. Field of the Invention

The present invention relates generally to a release rod apparatus for releasing a locking mechanism and, particularly, to a release rod for releasing the main locking mechanism of a parking brake control.

2. Brief Description of the Related Art

A typical parking brake control is a locking mechanism using an operating lever to give mechanical advantage to a human operator. Such controls are designed to be operated either by hand or by foot.

The typical release rod for a hand operated parking brake control is stamped from metal. A soft plastic button is typically molded to one end as the interface with the human operator. The molded button is an extra part and requires at least one extra manufacturing process to make.

The other end of the release rod is adapted to connect with the locking mechanism. In a control which uses a ratchet and pawl as the main locking mechanism, the release rod is connected to the pawl. Typically, the pawl has a raised circular portion at one end that fits into a hole in the end of the release rod. Once installed, both pawl and release rod may rattle.

Such a design does not give rise to a release rod and pawl subassembly that stays together for shipping or storage.

Such a design also does not lend itself to molding a release rod out of the type of soft plastic, such as polypropylene, used to make the button. This is because such a release rod transfers force to the pawl not coplanarly, but in parallel planes. The main body of the release rod is in a plane parallel to that of the main body of the pawl, connected by the circular raised portion of the pawl. Such noncoplanar transfer of force would tear through the end of such a rod made from soft plastic.

SUMMARY OF THE INVENTION

Accordingly, one object of the invention is to provide a release rod in which force can be transmitted coplanarly to the pawl.

Another object of the invention is to provide a subassembly of a release rod and pawl in which the pawl is retained by the release rod so that the subassembly, as such, can be stored, transported and easily incorporated into the parking brake control.

Another object of the invention is to prevent disengagement of the pawl from the release rod after assembly into and during operation of the parking brake control.

Another object of the invention is to avoid excess travel when pushing the button on the end of the release rod to release the pawl.

Another object of the invention is to dampen any rattling noise caused by the pawl or the release rod.

Another object of the invention is to provide an improved release rod that can be substituted for the traditional release rod without having to modify other components of the parking brake control, especially the traditional main pawl.

Other objects and advantages of the invention will become apparent from a study of the following specification when viewed in light of the accompanying drawings.

BRIEF DESCRIPTION OF THE DRAWINGS

In the drawings:

FIG. 9 shows a back elevation view of the release rod shown in FIG. 7.

FIG. 10 shows an enlarged back elevation view, with parts broken away, of the retention end of the release rod shown in FIGS. 7–9.

FIG. 11 shows a cross section of that portion of the release rod as shown in FIG. 8 as taken in the direction of arrows 11—11 in FIG. 8.

FIG. 12 shows a partially exploded perspective view of an embodiment of the invention with parts shown schematically.

DETAILED DESCRIPTION OF THE RELATED ART SHOWN IN FIGS. 1–5

Figure 1:
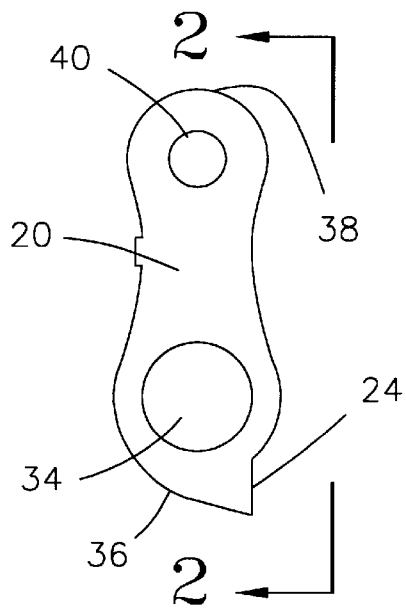
FIG. 1 shows a front elevation view of a main pawl which is well known in the prior art.
Figure 2:
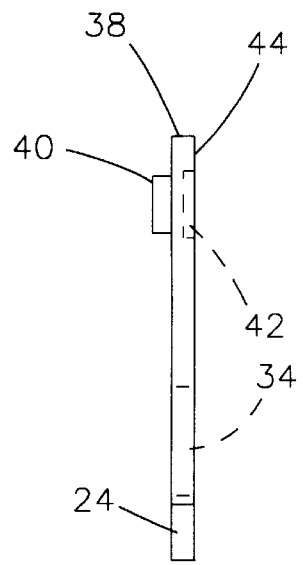
FIG. 2 shows an edge elevation view of the main pawl illustrated in FIG. 1 as taken in the direction of arrows 2—2 of FIG. 1.
Figure 3:
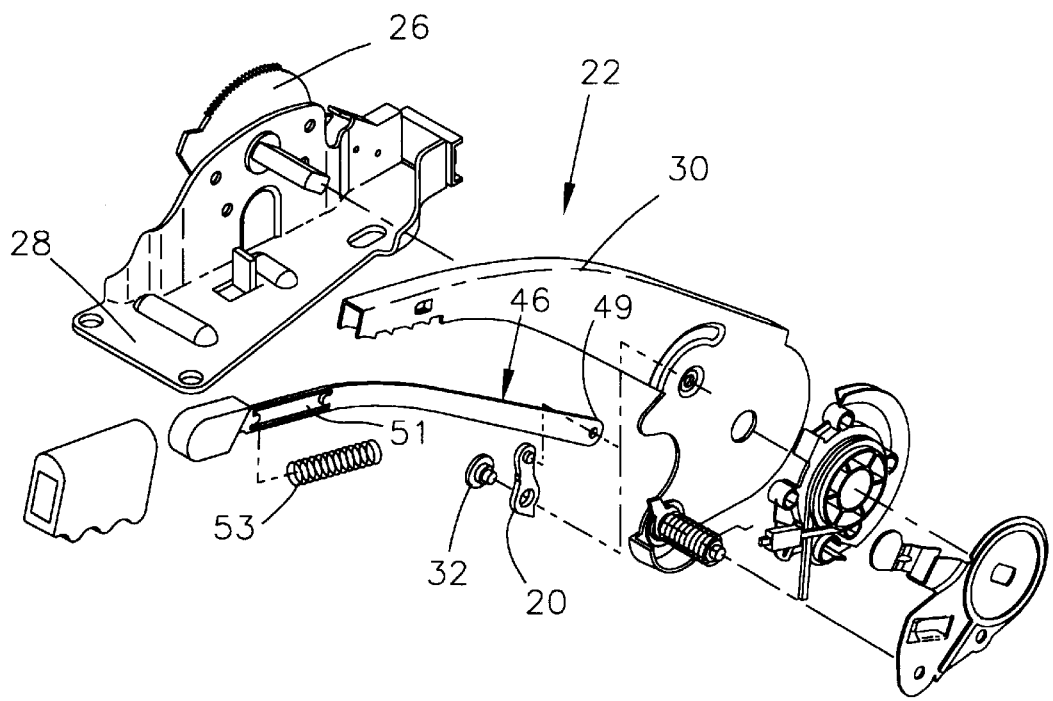
FIG. 3 shows a partially exploded perspective view of a parking brake control with a traditional release rod with parts shown schematically.

FIG. 1 shows a front elevation view of typical main pawl 20 which is part of a ratchet and pawl main holding mechanism for a parking brake control. FIG. 2 shows an edge elevation view of pawl 20. FIG. 3 shows parking brake control 22 in partially exploded perspective view. Pawl tooth 24 selectively engages ratchet sector 26 on mounting bracket 28 upon application of operating lever 30, rotatably mounted on mounting bracket 28, from the brake-released position toward the brake-applied position to increasingly tension the parking brake cable to apply the brakes Pawl rivet 32 connected to operating lever 30 goes through hole 34 in pawl 20 near toothed end 36 of the pawl. The other end of the pawl is toothless, rounded end 38. Near the end of rounded end 38, on the front of pawl 20, is a circular raised portion 40 and, on the back of pawl 20 as illustrated in FIG. 2, is a circular indentation 42 which is surrounded by lip 44 and is concentric with circular raised portion 40.

Figures 4, 5, 6, 7, 8:
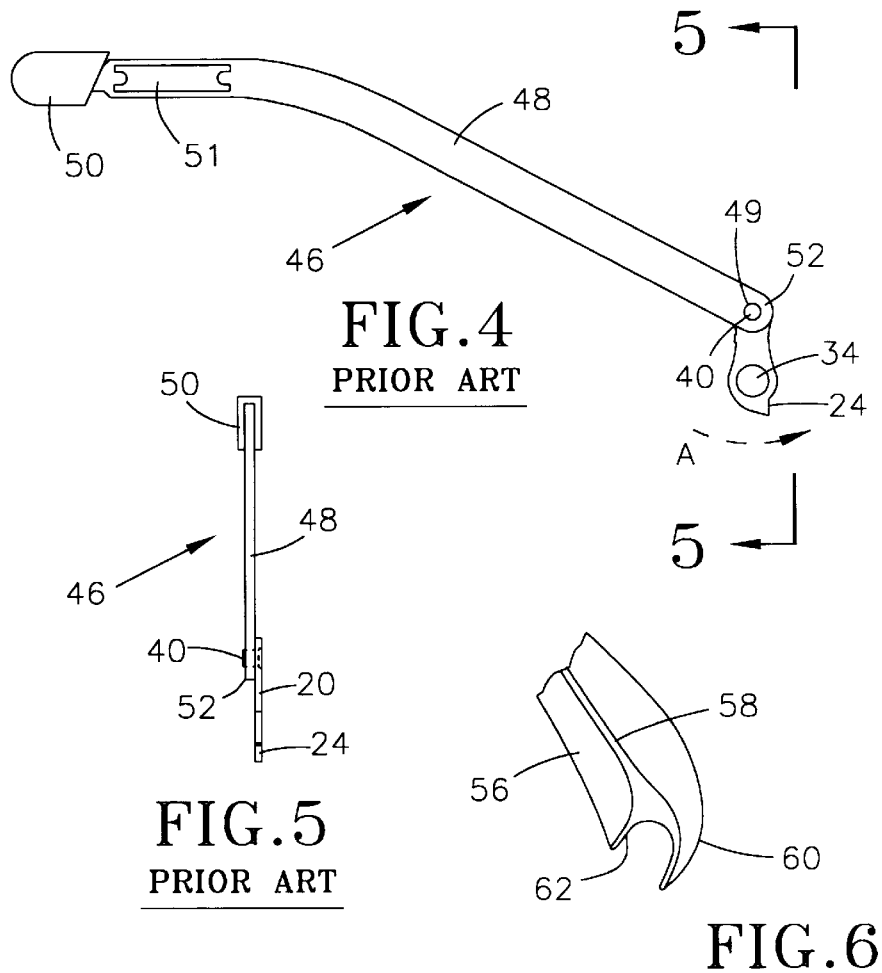
FIG. 4 shows a front view of a release rod assembly known in the prior art including the same main pawl illustrated in FIGS. 1 and 2 attached to a traditional release rod.
FIG. 5 shows an edge elevation view of the same release rod assembly illustrated in FIG. 4 as taken in direction of arrows 5—5 of FIG. 4.
FIG. 6 is a fragmentary front elevation view of one end of an intermediate design for a plastic release rod having certain features of the invention.
FIG. 7 shows a front elevation view of a release rod comprising one embodiment of the invention.
FIG. 8 shows an enlarged front elevation view, with parts broken away, of the retention end of the release rod shown in FIG. 7.

FIG. 4 shows a traditional release rod assembly 46 comprising pawl 20 connected by circular raised portion 40 to a traditional release rod 48 through circular hole 49 which is surrounded by lip 52 in release rod 48. The main portion of such a release rod typically has been stamped from metal with button 50 being manufactured from plastic. Slot 51 captures release spring 53 (shown in FIG. 3) which, upon assembly into the parking brake control, urges the release rod 48 in the direction of button 50 which, in turn, urges pawl tooth 24 into engagement with the ratchet sector 26 (shown in FIG. 3) by rotating pawl 20 around pawl rivet 32 (shown in FIG. 3) through hole 34 in the rotational direction of arrow A. Upon button 50 being pushed, release spring 53 compresses against tabs on the inside of operating lever 30. All of the operations described in this paragraph are well known in the commercial prior art.

Incorporating traditional release rod assembly 46 into the overall parking brake control 22 is not a simple process. Prior to permanently affixing assembly 46 into control 22 by riveting pawl rivet 32 through hole 34 of pawl 20, pawl 20 is not retained in hole 49 in traditional release rod 48 unless the pawl is manually or otherwise held in place temporarily. Traditional release rod assembly 46 cannot be stored or transported as a stable subassembly, but remains as two separate parts until both are permanently incorporated into the parking brake control.

Once assembled into the parking brake control, traditional release rod assembly 46, while fully functional, presents other problems. First, there is always a little play in the assembled pawl 20 between pawl rivet 32 and hole 34 in the pawl. Accordingly, pawl 20 is free to rattle against the inner walls of the trough of the operating lever in which pawl 20 is contained. Since traditional release rod 48 is made from metal, it also tends to rattle.

Secondly, traditional stampings carry the attendant weight associated with metal. Finally, the addition of plastic button 50 onto the metal body of a traditional release rod entails at least one additional part and at least one additional manufacturing process.

Thirdly pushing button 50 creates inherent shearing and twisting forces between release rod 48 and pawl 20 which prevent traditional release rod 48 from being fabricated from soft plastic, such as polypropylene, from which button 50 is often made. FIG. 5 shows an edge elevation view of traditional release rod assembly 46. As illustrated, the main bodies of pawl 20 and traditional release rod 48, respectively, are not coplanar but lie in parallel planes as is illustrated. Only raised portion 40 of pawl 20 is coplanar with release rod 48. Accordingly, when button 50 is pushed to disengage pawl 20 from engagement with ratchet sector 26, the forces transmitted through release rod 48 and pawl 20, respectively, are in parallel planes and create shearing forces and twisting forces against lip 52 surrounding hole 49 of release rod 48. These forces are not significant when release rod 48 is fabricated from metal, but are sufficient to prevent rod 48 from being fabricated from soft plastic.

DETAILED DESCRIPTION OF EMBODIMENTS OF THE INVENTION

FIG. 6 shows one end of an interim design for a plastic release rod 56 which has certain features of the invention. Structural rib 58 extends down the length of release rod 56 on each side and, near trough end 60, creates a generally U-shaped wall 62 which defines a trough to receive rounded end 38 of pawl 20. Upon pushing release rod 56, force is applied relatively coplanarly through pawl 20 by way of wall 62 to rotate pawl 20 sufficiently to disengage pawl tooth 24 from ratchet sector 26 (shown in FIG. 12). Certain nonplanar forces could still occur because pawl 20 is not contained laterally by release rod 56 and is, thus, free to wiggle laterally due to the play between pawl rivet 32 and hole 34 in pawl 20. While the release rod design shown in FIG. 6 is sturdy enough to function, it does not prevent the rattling of pawl 20, does not give rise to a stable rod and pawl subassembly and presents an additional problem of having excess travel when pushing release rod 56 to disengage pawl 20 as one of the sides of wall 62 of the release rod travels past the rounded end 38 of the pawl until roof of wall 62 stops against rounded end 38 such that significant force can be transmitted from the release rod to the pawl.

FIG. 7 shows a front elevation view of the release rod 64 which is made of soft plastic such as polypropylene. On one end of release rod 64 is an integrally formed raised button 66 which defines the button end 67 of the rod. A raised structural rib 68 extends nearly the length of release rod 64 generally along its top. Another raised structural rib 70 extends nearly the length of release rod 64 generally along its bottom. Retention end 72 is at the end of release rod 64 opposite button end 67.

FIG. 8 shows an enlarged front elevation view of retention end 72. Raised ribs 68 and 70 combine near retention end 72 to form a generally circular wall 74. Circular wall 74 defines an inner wall surface 76 which is larger in diameter than the diameter of raised portion 40 of pawl 20, but is smaller in diameter than the projected outside diameter of rounded end 38 of pawl 20. In the illustrated embodiment, inner wall surface 76, has two diametrically opposed recesses 78 whose purpose is to allow injection molding of crossbar 80 on the back of retention end 72.

Circular wall 74 is comprised of a circular wall roof 82, a circular wall floor 84, a circular wall inner side wall 86 and a circular wall outer side wall 88. The tip 89 of release rod retention end 72 extends past circular wall outer side wall 88. The inner wall surface 76 is generally flattened over circular wall floor 84.

FIG. 9 shows the back elevation view of release rod 64 on the opposite side as the front view as illustrated in FIG. 7. Release spring 123 (shown in FIG. 12) is retained in release spring retention cavity 90 by tabs 92 and 94. In the illustrated embodiment, this side of release rod 64 does not contain raised ribs on the top and bottom except extending slightly from button 66. However, at retention end 72, release rod 64 has a generally U-shaped wall 96 which is slightly raised similarly to raised ribs 68 and 70.

FIG. 10 shows an enlarged back elevation view of retention end 72 of rod 64 as illustrated in FIG. 9. The generally U-shaped wall 96 is comprised of a wall roof 98, an inner side wall 100 and an outer side wall 102. Wall 96 has an inner surface 104 which defines a trough which is slightly wider than the width or outside diameter of rounded end 38 of pawl 20. Since the inner wall surface 76 of circular wall 74 on the front of release rod 64 is not as wide as rounded end 38,of the pawl 20, the inner surface of circular wall 74 can be seen from the back view of retention end 72.

Crossbar 80 is connected on the outside of U-shaped wall inner side wall 100 and U-shaped wall outer side wall 102 at connection points 106 and 108, respectively.

Circular wall 74, U-shaped wall 96 and crossbar 80 define a space referred to as retention cavity 110 which extends transversely of release rod 64. The center of crossbar 80 dips inwardly into retention cavity 110 from connection points 106 and 108.

FIG. 11 shows a cross section of that portion of retention end 72 of release rod 64 as shown in FIG. 10 as taken in the direction of arrows 11—11 in FIG. 10 and shows the relationship between crossbar 80, circular wall 74 and U-shaped wall 96.

FIG. 12 shows the entire parking brake control 112 in a partially exploded, schematic view. The cross section of operating lever 30 forms a generally U-shaped wall 114, as shown at lever tip 116, which defines a narrow trough 118 between the parallel inner surfaces of wall 114 inside operating lever 30. Release rod 64 and pawl 20 comprise release rod assembly 120. After assembly into park brake control 112, nearly all of release rod assembly 120 is disposed in trough 118 and between the inner surfaces of U-shaped wall 114 of operating lever 30. Pawl rivet 32 extends through hole 34 of pawl 20 and is riveted through hole 119 and into operating lever 30. Release spring 123 is shown in release spring retention cavity 90.

Figure 13:
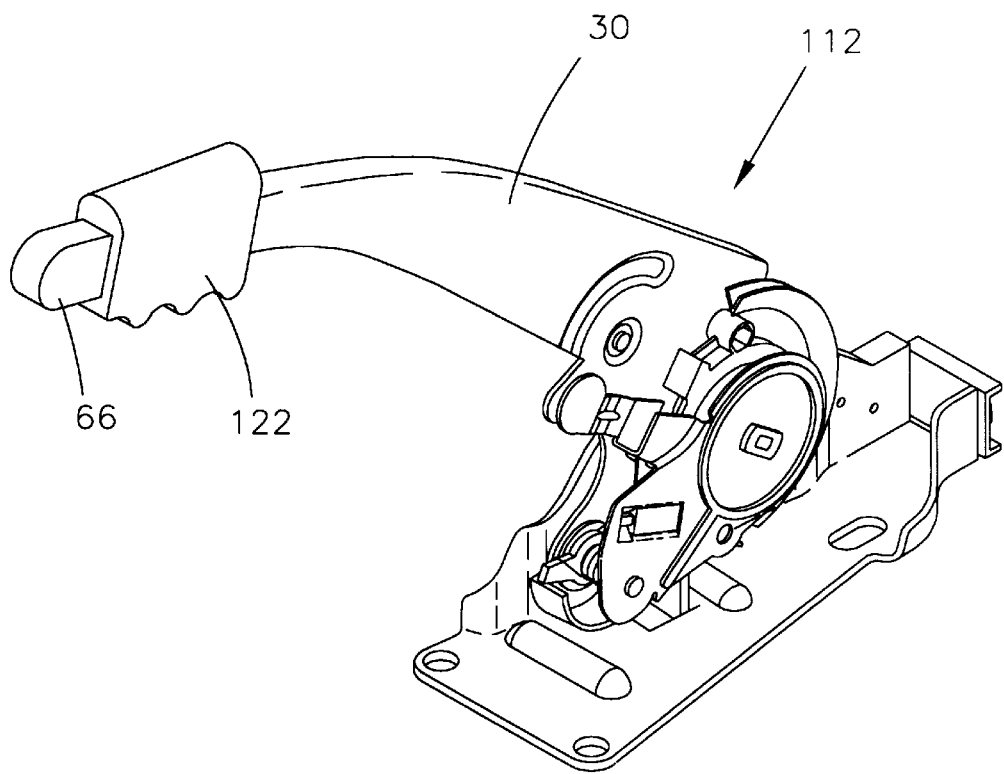
FIG. 13 shows the FIG. 12 embodiment in an assembled condition and, by a dashed line relates it to the illustration in FIG. 11.

FIG. 13 shows the parking brake control 112 in an assembled unexploded view with release button 66 protruding out the end of handle grip 122 on operating lever 30.

Pawl 20 can be inserted into release rod retention cavity 110 and retained therein by the following procedure. First, pawl 20, positioned at an angle of about 45 degrees relative to release rod 64, is pushed into contact with crossbar 80 and circular wall floor 84. In such contact position, the edge of raised portion 40 of pawl 20 contacts the inner surface of circular wall floor 84 and, furthermore, lip 44 of pawl 20 contacts the lower, inner edge of crossbar 80.

Next, from such contact position, continuing force is applied through pawl 20 in the direction from tooth end 36 to rounded end 38. Since circular wall floor 84 and crossbar 80 are somewhat resilient, this continuing force causes circular wall floor 84 and crossbar 80 to flex outwardly enough to allow pawl 20 to snap into retention cavity 110 and the rounded end 38 of pawl 20 to snap against the inner surface of wall roof 98 of release rod 64.

Upon pawl 20 snapping into retention cavity 110, circular wall floor 84 and crossbar 80 resiliently return to their respective original positions, raised portion 40 of pawl 20 is generally disposed within inner wall surface 76 of circular wall 74 and, thus, pawl 20 is trapped in its retained position and aligns generally coplanarly with release rod 64.

Pawl 20 cannot be easily removed from its retained position without pulling pawl 20 out of retention cavity 110 while simultaneously forcing pawl 20 into the same approximately 45 degree angle relative to release rod 64 required to insert pawl 20 into retention cavity 110, which simultaneous process is difficult without conscious effort. Accordingly, release rod assembly 120 can be treated as a subassembly of park brake control 112 and, as a subassembly, can be separately stored and transported and is much easier to assemble into control 112 than traditional release rod 48 and pawl 20.

Once release rod assembly 120 is riveted and permanently incorporated into control 112, the close proximity of release rod assembly 120 and the inner surfaces of U-shaped wall 114 of lever 30 cause pawl 20 and release rod 64 to remain substantially coplanar with respect to one another and prevents the occurrence of the angle of pawl 20 relative to release rod 64 that is necessary to remove pawl 20 from its retained position in retention cavity 110.

Figure 14:
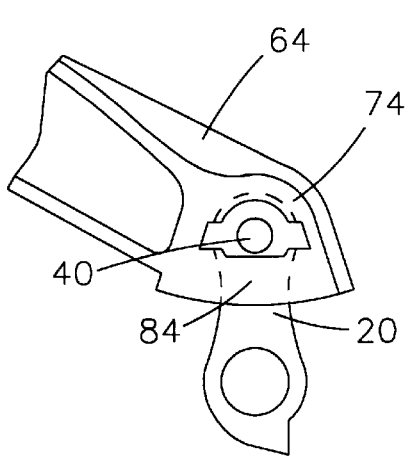
FIG. 14 shows the pawl of FIGS. 1 and 2 in its retained position in the retention end of the release rod as that retention end is illustrated in FIG. 8.

Referring now to FIG. 14, pawl 20 is shown in its retained position from the enlarged front view illustrated in FIG. 8. Likewise, in FIG. 15, pawl 20 is shown in its retained position from the enlarged back view illustrated in FIG. 10.

Figure 15:
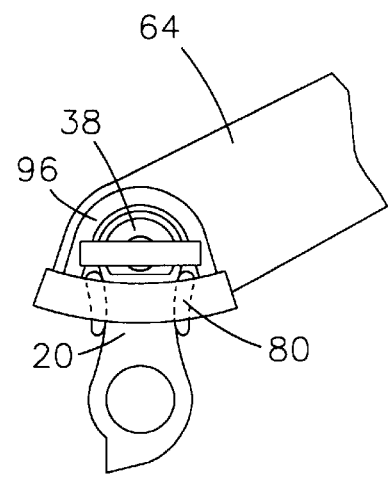
FIG. 15 shows the pawl of FIGS. 1 and 2 in its retained position in the retention end of the release rod as that retention end is illustrated in FIG. 9.

As illustrated in FIG. 15, pawl 20 is retained from substantial movement upward or from side to side due to the outer edge of rounded end 38 of pawl 20 eventually stopping against the inner surface of U-shaped wall 96 of release rod 64. As illustrated in FIG. 13, Pawl 20 is retained from moving downward due to the edge of raised portion 40 of pawl 20 eventually stopping against circular wall floor 84 of release rod 64. Pawl 20 is retained from substantial movement laterally due to the front or back of rounded end 38 eventually stopping against either the inner surfaces of circular wall 74 or crossbar 80. In particular, the inward extension of the center of crossbar 80 prevents lateral movement of pawl 20 sufficient for raised portion 40 of pawl 20, in its downward movement, ever not to stop against circular wall floor 84 of release rod 64.

Once release rod assembly 120 is assembled into control 112, the greatest force transmitted between pawl 20 and release rod 64 during operation of parking brake control 112 occurs upon the human operator pushes release rod button 66 to disengage pawl tooth 24 from engagement with ratchet sector 26. In such case, the pawl-disengaging force is transmitted substantially coplanarly as a compression force through pawl 20 and release rod 64 because a portion of the inner surface of U-shaped wall 96 of release rod 64 is also coplanar with and part of the main body of release rod 64. Accordingly, the raised portion of U-shaped wall 96 does not receive significant shearing forces. Circular wall 74 receives no significant shearing forces during such application of release rod 64 because raised portion 40 of pawl 20 never contacts the raised portion of circular wall 74.

Circular wall 74 of release rod 64, being raised from the main body of release rod 64, is not coplanar, but in parallel planes with the main body of release rod 64. However, the only portion of circular wall 74 that contacts any portion of pawl 20 during operation of parking brake control 112 is circular wall floor 84 which sometimes contacts raised portion 40 of pawl 20. Such contact only occurs as the operator stops pushing on button 66 of release rod 64 to overpower release spring 123. Accordingly, the force on circular wall floor 84 is insignificant, even with a soft plastic release rod because circular wall floor 84 will not receive any force greater than that generated by release spring 89 as it urges release rod 64 upward until pawl tooth 24 engages a tooth of ratchet sector 26, whereupon raised portion 40 on the front of pawl 20 soon loses contact with any portion of circular wall 74 because rounded end 38 on the back of pawl 20 is soon forced into coplanar contact with release rod 64 through its U-shaped wall roof 98.

The outer surfaces of circular wall 74 and U-shaped wall 96, respectively, of release rod 64 extend laterally outward further than any portion of pawl 20, inhibiting pawl 20 from rattling by preventing contact between pawl 20 and operating lever 30. When release rod 64 is fabricated from plastic, any rattling noise is dampened as compared to that caused by a metal release rod. Fabrication of release rod 64 from soft plastic would not be practical without coplanar transmission of force between release rod 64 and pawl 20 upon pushing release rod button 66 to apply release rod 64.

What is claimed is:

1. A parking brake control comprising:
   (a) a mounting bracket having a ratchet sector thereon;
   (b) an operating lever connected to said mounting bracket for pivotal movement about a first axis between brake-applied and brake-released positions;
   (c) a release rod assembly comprising a pawl and a release rod, said pawl connected to said operating lever for pivotal movement about a second axis between engaged and disengaged positions relative to said ratchet sector, said second axis being parallel to said first axis, said pawl having a first end and a second end disposed on opposite sides of said second axis, said pawl having a tooth on said first end which said tooth is selectively engaged with said ratchet sector, and said pawl having a raised portion near said second end, said release rod having a front and a back and being formed to define a retention cavity at one end, said retention cavity being further defined on said front of said release rod by a generally circular wall having a diameter less than the width of said second end of said pawl and greater than the width of said raised portion on said second end of said pawl, said retention cavity being further defined on said back of said release rod by a generally U-shaped wall comprising a roof portion and sidewalls on either side of said roof portion with a crossbar integrally connected to said release rod and extending between said sidewalls, said sidewalls being slightly further apart than the width of said second end of said pawl, said pawl being retained by said U-shaped wall, said crossbar and said generally circular wall with a portion of said pawl being retained in said retention cavity.

2. The parking brake control of claim 1, wherein said pawl and said release rod are substantially coplanar.

3. The parking brake control of claim 2, wherein said operating lever is of generally U-shaped construction in its cross-section with two lever walls defining a trough within said operating lever, said release rod and said pawl being generally disposed within said trough, the lateral width of said trough being greater than the maximum lateral width of said release rod and said pawl disposed within said trough, such that the walls of said trough maintain said pawl in substantially coplanar alignment with said release rod.

4. The parking brake control of claim 3, wherein said U-shaped wall and said generally circular wall of said release rod are in closer proximity than said pawl to the inner surfaces of said walls of said operating lever.

5. The parking brake control of claim 1, wherein said release rod is molded as a single piece.

6. The parking brake control of claim 1, wherein said circular wall has an upper portion and a lower portion, said lower portion being resilient.

7. The parking brake control of claim 1, wherein said crossbar is resilient.

8. The parking brake control of claim 1, wherein said crossbar is connected to said release rod at at least two points on said U-shaped wall.

9. The parking brake control of claim 8, wherein said crossbar has a center point substantially equidistant between two of said wall points, said center point extending inwardly toward the front of said release rod relative to said two wall points.

10. The parking brake control of claim 9, wherein said pawl has an indentation near said second end of said pawl, which indentation is on the opposite side of said pawl as said raised portion of said pawl; said center point of said crossbar extending into said indentation of said pawl.

11. A release rod and pawl combination adapted for use in a parking brake control, said pawl comprising a first end and a second end disposed on opposite sides of an axis, said pawl having a tooth on said first end, and said pawl having a raised portion near said second end; and said release rod comprising a front and a back and being formed to define a retention cavity extending transversely of and at one end of said release rod;

said retention cavity being further defined on said front of said release rod by a generally circular wall having a diameter less than the width of said second end of said pawl and greater than the width of said raised portion on said second end of said pawl, said retentioin cavity being further defined on said back of said release rod being further adapted to retain said pawl by said U-shaped wall and said crossbar and said generally circular wall such that, when said pawl is so retained, a portion of said pawl is retained in said retention cavity.

12. The combination of claim 11, wherein said release rod is further adapted to retain said pawl substantially coplanarly.

13. The combination of claim 11 wherein said pawl has an indentation near said second end of said pawl, which indentation is on the opposite side of said pawl from said raised portion of said pawl; a center point of said crossbar being adapted to extend into said indentation of said pawl when said pawl is so retained by said release rod.

14. A release rod adapted for use in a parking brake control said release rod comprising:

a front and a back and being formed to define a retention cavity extending transversely of and at one end of said release rod;

said retention cavity being further defined on said front of said release rod by a generally circular wall, said retention cavity being further defined on said back of said release rod by a generally U-shaped wall comprising a roof portion and sidewalls on either side of said roof portion with a crossbar integrally connected to said release rod and extending between said sidewalls.

15. The release rod of claim 14, wherein said crossbar is connected to said release rod at at least two points on said U-shaped wall.

16. The release rod of claim 15, wherein said crossbar has a center point substantially equidistant between two of said wall points, said center point extending inwardly toward the front of said release rod relative to said two wall points.

17. The release rod of claim 14, wherein said release rod is molded as a single piece.

18. The release rod of claim 11, wherein said crossbar is resilient.

* * * * *